United States Patent [19]

Rauchenecker

[11] 3,903,434

[45] Sept. 2, 1975

[54] CONTROLLABLE VOLTAGE DIVIDER

[75] Inventor: Konrad Rauchenecker, Ottobrunn, Germany

[73] Assignee: Siemens Aktiengesellschaft, Berlin & Munich, Germany

[22] Filed: May 3, 1974

[21] Appl. No.: 466,793

[30] Foreign Application Priority Data

May 4, 1973 Germany ............................ 2322558

[52] U.S. Cl. ............... 307/264; 323/43.5 S; 330/29

[51] Int. Cl.² ............................................ H03K 1/14

[58] Field of Search .... 307/264; 323/23, 25, 43.5 S; 330/29, 30

[56] References Cited

UNITED STATES PATENTS 3,470,452 9/1969 Watson ........................... 323/43.5 S 3,514,688 5/1970 Martin ............................ 323/43.5 S

FOREIGN PATENTS OR APPLICATIONS 1,616,368 4/1971 Germany

*Primary Examiner*—John Kominski

*Attorney, Agent, or Firm*—Hill, Gross, Simpson, Van Santen, Steadman, Chiara & Simpson

[57] ABSTRACT

A controllable voltage divider utilizing transistors connected such that their collector-emitter paths are positioned in the partial voltage paths which are to be supplied to an output and wherein selected transistors can be turned on by supplying a bias voltage to their base through a high ohmic base resistor and wherein a common high ohmic emitter resistance is connected in circuit with all of the transistors such that the load on the voltage divider is maintained so small that dividing errors do not occur due to the internal resistance of the voltage source supplying the voltage which is to be divided and/or due to the tolerance of the internal resistance of the individual transistors.

8 Claims, 2 Drawing Figures

CONTROLLABLE VOLTAGE DIVIDER

BACKGROUND OF THE INVENTION

1. Field of the Invention

This invention relates in general to a controllable voltage divider whereby the voltage to be divided is connected across series connected inductors or ohmic resistors, and wherein a plurality of voltage control transistors are connected to different points of the voltage divider such that by turning selected transistors on, selected voltages can be obtained.

2. Description of the Prior Art

A voltage divider is described in German Pat. No. 1,616,368, wherein transistors have their base terminals connected to associated partial voltage points through capacitors, and wherein a control voltage is selectively applied to the individual base connections via ohmic voltage dividers so as to turn on one of the transistors.

SUMMARY OF THE INVENTION

The present invention relates to an improved voltage divider, wherein series connected inductances or ohmic resistors are connected across a voltage source the voltage of which is to be divided, and transistors are connected to the connection points of said inductors or resistors with either the emitters or collectors connected to the connection points and with the bases of the transistors connected to a selected bias voltage so as to turn selected ones of the transistors on. A common high-emitter resistor is connected in the emitter circuit and a high base resistance is connected into the base circuit of each of the transistors so as to substantially reduce the load on the voltage divider thus giving great accuracy of the output of the voltage divider and thus eliminating the errors due to the internal resistance of the voltage source applying the voltage which is to be divided and as well as eliminating the effect of uneven internal resistances of the individual transistors. The high ohmic resistance of the series base resistances and the emitter resistance which is shared by all transistors as well as the operation of the transistors without an collector-voltage source results in an almost load-free control of the voltage divider. For example, such circuit could be used to control batterysupplied devices.

If the voltage divider of the invention is built inductively a maximum of dividing exactness is obtained with relatively small expense since the measuring tolerances of the series connected inductances particularly when sufficiently large number of turns are used are so small that the dividing precision which can be obtained by the embodiment by the remaining circuit parts will not be lowered.

A further advantage of the invention lies in the fact that the inverse voltage which is furnished to the inputs of the transistors which are not conducting allows a correspondingly large input amplitude of the voltage which is to be divided without causing it to be limited by the blocked transistors.

The invention also provides that a transistor amplification stage may be connected to the divider output so as to obtain power amplification and/or impedance transformation and such transistor amplifier need not have its own base voltage divider since its base voltage will consist of the part of the control voltage arriving at the divider output. This results in the advantage that the load on the voltage divider due to the subsequently connected amplifier stage will not be increased since it is also provided with a high ohmic input resistance, if the output resistance is low resistance, the high ohmic input resistance corresponds to the product of the output resistance and the current amplification.

Other objects, features and advantages of the invention will be readily apparent from the following description of certain preferred embodiments thereof, taken in conjunction with the accompanying drawing, although variations and modifications may be effected without departing from the spirit and scope of the novel concepts of the disclosure, and in which:

DESCRIPTION OF THE PREFERRED EMBODIMENTS

Figure 1:
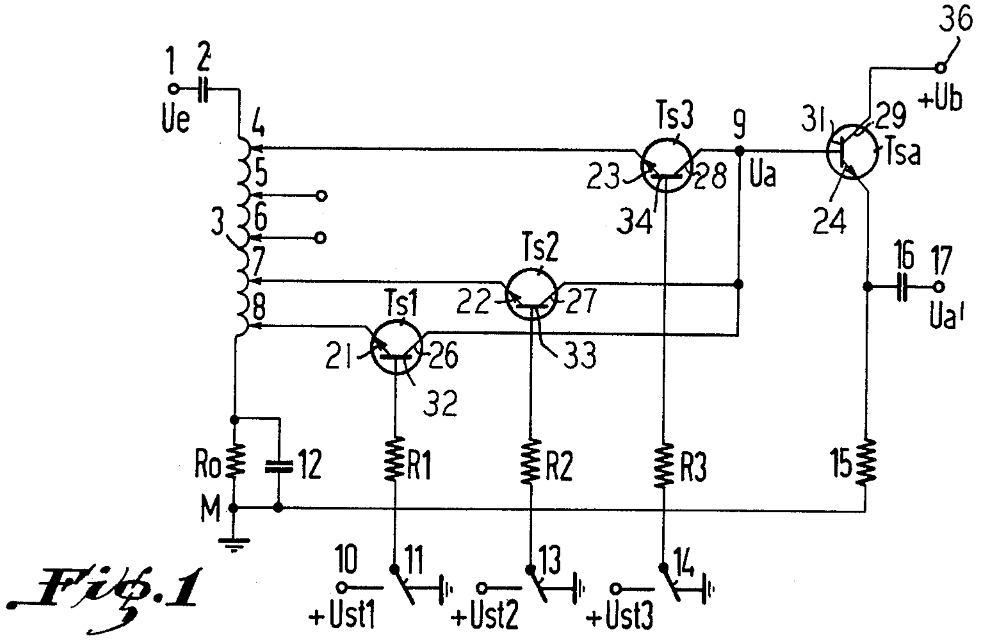
FIG. 1 is a schematic diagram illustrating the emitters of the dividing transistors connected to the voltage divider impedance.

FIG. 1 illustrates an input terminal 1 to which either a direct or alternating current voltage Ue which is to be divided is connected. A coupling capacitor 2 is connected to the input terminal 1 and has its other terminal connected to a voltage divider 3 which may be either an inductive or resistive voltage divider. Tap contacts 4–8 are connected to the voltage divider 3 so as to tap partial voltages from the voltage divider. The other end of the voltage divider 3 is connected to ground through a parallel connected resistor Ro and a capacitor C12 which serves as an alternating current shunt. The point M is either ground or a suitable reference potential.

A plurality of transistors T*s*1, T*s*2, and T*s*3 are in the embodiment illustrated in FIG. 1 connected such that their emitter terminals 21, 22, and 23, respectively, are connected to contact points 8, 7, and 4 of the voltage divider 3. The collectors of transistors T*s*1, T*s*2, and T*s*3 are connected together and to terminal point 9 which is connected to the base 31 of an output transistor T*sa*. The base 32 of transistor T*s*1 is connected to a base resistor R1 which has its other side connected to a movable switch contact 11 which in one position engages ground potential and in the other position engages a voltage +U*st* 1 which is supplied to terminal 10. The base 33 of transistor T*s*2 is connected to a resistor R2 which has its other side connected to movable contact 13 which is engageable either with ground contact or with a contact to which voltage +U*st* 2 is connected. The transistor T*s*3 has its base 34 connected to a resistor R3 which has its other side connected to movable contact 14 that engages either ground or voltage +U*st* 3.

The output transistor T*sa* has its collector 29 connected to terminal 36 and its emitter 24 connected to a capacitor 16 which has its other side connected to terminal 17. A resistor 15 is connected between the emitter 24 and reference point M.

In operation, if the voltage at contact point 8 of the voltage divider 3 is to be utilized, the switch 11 is moved to engage terminal 10 thus turning transistor T*s*1 on due to the positive bias +Ust 1 and transistors T*s*2 and T*s*3 are biased off since their switches 13 and 14, respectively, engage ground. The base emitter circuit of transistor Ts1 passes through the high ohmic series resistance base resistor R1, through the contact 8 and a high ohmic emitter resistor Ro which is series connected with the voltage divider 3. The control voltage +Ust 1 divides corresponding to the ratio of the resistors R1 and R0 such that a part of the control voltage is obtainable at the emitter connection and at contact point 8. This portion of +Ust 1 is supplied to the remaining blocked transistors Ts2 and Ts3 through contacts 4 and 7 as emitter side inverse voltages.

The through connection of contact point 8 toward the divider output 9 thus automatically causes an application of an input side inverse voltage to the transistors associated with the remaining contacts 4–7 which prevents a limitation of the voltage Ue which is to be divided so long as the amplitude of Ue does not increase above the value of the inverse voltage. This means that the circuit due to the corresponding selection of the control voltage +Ust 1 and the values of the resistors R1 and R0 which determine the corresponding selection of the inverse voltage amplitude operate without dynamic faults up to given amplitude values.

The transistors such as Ts2 and Ts3 can, of course, be individually opened in a manner analogous to that explained relative to transistor Ts1 by supplying the control voltages +Ust 2 or +Ust 3, respectively, via the high ohmic base resistors R2 and R3 such that a corresponding distortion free through connection of the associated contacts 7 or 4 toward the divider output 9 will result.

The high ohmic resistance of resistance R0, R1, R2, and R3 as well as the omission of a collector-voltage source with regard to the transistors Ts1 – Ts3 results in almost complete power free control of the voltage divider. Since these resistors constitute shunt impedances of the individual partial voltage paths, their high ohmic characteristic will also achieve less load on the voltage divider. Also, the non-neglectable internal resistance of the voltage source Ue which is important particularly relative to the upper contacts 4 and 5 and the internal resistance of the transistors Ts1 through Ts3 are so small as compared with the high ohmic output resistance which is effectively in parallel to the voltage divider output 9 that the internal resistance of the source Ue and of the transistors Ts1 through Ts3 do not result in a noticeable dividing fault or error.

The transistor amplifier stage Tsa can be connected to the divider output to amplify the power or to obtain an impedance transformation. The collector 29 is connected to the operational potential Ub and the emitter 24 is connected through the wire and emitter resistance 15 to circuit point M.

The voltage Ua' is applied to the output terminal 17 through the coupling capacitor 16. The connection of the amplifier stage Tsa does not substantially increase the load upon the voltage divider. The base bias of transistor Tsa comprises the control voltage at the divider output 9. The emitter resistance 15 is reflected toward the base side as a function of the current amplification of transistor Tsa; and thus, the load upon the voltage divider and dividing errors is not substantially increased by the addition of the transistor Tsa.

Figure 2:
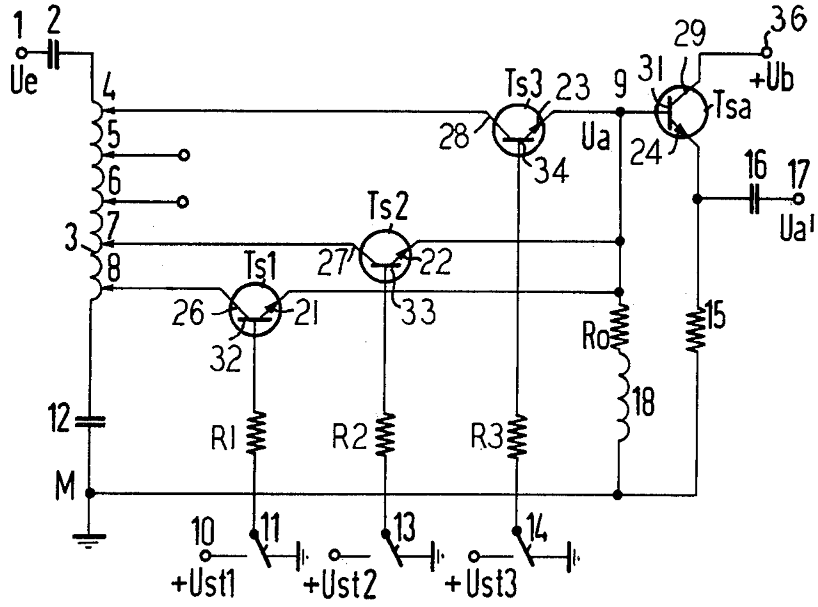
FIG. 2 is a modification illustrating the collectors of the voltage dividing transistors connected to the voltage dividing impedance.

FIG. 2 is a modification of the invention, wherein the transistors Ts1, Ts2, and Ts3 are connected with their collectors 26, 27, and 28, respectively, to the contact points 8, 7, and 4 of the voltage divider 3 and their emitters 21, 22, and 23 to divider output terminal 9. Resistor R0 has been removed from its connection in parallel with capacitor 12 and a resistor R'0 has been connected from contact point 9 to an inductance 18 which has its other side connected to reference point M. In operation, the circuit of FIG. 2 operates very similar to that of FIG. 1 except that the joint emitter resistance R0 of FIG. 1 is not positioned in series with the voltage divider 3 but a resistance R'0 is connected in parallel between divider output point 9 and reference point M. In order to avoid the influence of the tolerance of the internal resistances of the transistors which could effect the dividing accuracy, the inductance 18 is added in series with the resistor R'0. Otherwise the method of operation of the circuit of FIG. 2 corresponds to that of the embodiment of FIG. 1. The voltage divider of the invention can be used with remote control by using base supply lines having suitable lengths to the transistors Ts1 through Ts3 which allows the application as measuring range switch in receivers of automatic information measuring techniques in particular level measuring techniques.

A test circuit constructed as a voltage divider utilizing the invention disclosed herein resulted in dividing faults below $10^{-3}$ which when the individual partial voltages differ from one another by 1 DB or even 10 DB results in very high dividing accuracy.

Although the invention has been described with respect to preferred embodiments, it is not to be so limited as changes and modifications may be made which are within the full intended scope as defined by the appended claims.

I claim as my invention:

1. A controllable voltage divider with a plurality of partial voltage contacts allocated to the connection points of several series connected inductive or resistive impedances and with a voltage to be divided being supplied to said series connected impedances, comprising a plurality of transistors with first electrodes connected to said plurality of contacts, partial voltage paths allocated to said contacts, the emitter-collector paths of said plurality of transistors being connected in the partial voltage paths, a plurality of control voltages connectible to the bases of said plurality of transistors to turn one of them on, a plurality of high ohmic resistors connected in the base circuits of said plurality of transistors, a high ohmic emitter resistor connected in the emitter circuits of all of said plurality of transistors such that a potential distribution exists within the base emitter circuits that a portion of the control voltage of the one transistor is supplied to the remaining of said plurality of transistors as an inverse voltage.

2. A voltage divider according to claim 1, wherein said first electrodes of said plurality of transistors are represented by the emitter terminals and said emitter resistor is connected in series with said inductive or resistive impedances.

3. A voltage divider according to claim 1, wherein said first electrodes of said plurality of transistors are represented by the collector terminals and said emitter resistor is connected in parallel to the divider output and an inductance is connected in series with said emitter resistor.

4. A voltage divider according to claim 1 comprising a transistor amplification stage connected with its base terminal to the divider output, its base voltage consisting of that portion of the control voltage which arrives at the divider output.

5. A voltage divider comprising an output terminal, an input voltage to be divided, a multitap voltage dividing impedance connected between said input voltage and ground, a plurality of switching transistors with their emitter-collector circuits connected between said output terminal and different taps on said multitap voltage dividing impedance, a plurality of high impedance resistors connected to the base electrodes of said plurality of switching transistors, control switch means connected to said plurality of bases through said plurality of resistors, and a high impedance emitter resistor connected in the current path of said plurality of switching transistors.

6. A voltage divider according to claim 5 wherein said emitters of said plurality of switching transistors are connected to said taps.

7. A voltage divider according to claim 5 wherein said collectors of said plurality of switching transistors are connected to said taps.

8. A voltage divider according to claim 7 including an inductance connected in series with said emitter resistor.

* * * * *